United States Patent
Pirch et al.

(10) Patent No.: US 12,136,308 B2
(45) Date of Patent: Nov. 5, 2024

(54) ULTRA-WIDE BAND RADAR FOR TAILGATING DETECTION IN ACCESS CONTROL SYSTEMS

(71) Applicant: ASSA ABLOY AB, Stockholm (SE)

(72) Inventors: Hans-Juergen Pirch, Feldkirchen (AT); Sylvain Jacques Prevost, Austin, TX (US)

(73) Assignee: ASSA ABLOY AB, Stockholm (SE)

(*) Notice: Subject to any disclaimer, the term of this patent is extended or adjusted under 35 U.S.C. 154(b) by 0 days.

(21) Appl. No.: 17/995,224

(22) PCT Filed: Mar. 3, 2021

(86) PCT No.: PCT/EP2021/055286
§ 371 (c)(1),
(2) Date: Sep. 30, 2022

(87) PCT Pub. No.: WO2021/204467
PCT Pub. Date: Oct. 14, 2021

(65) Prior Publication Data
US 2023/0186704 A1 Jun. 15, 2023

Related U.S. Application Data (60) Provisional application No. 63/008,252, filed on Apr. 10, 2020.

(51) Int. Cl.
*G07C 9/15* (2020.01)
*G01S 7/41* (2006.01)
(Continued)

(52) U.S. Cl.
CPC .............. *G07C 9/15* (2020.01); *G01S 7/411* (2013.01); *G01S 13/0209* (2013.01); *G01S 13/765* (2013.01)

(58) Field of Classification Search
CPC .. G07C 9/15; G07C 9/00182; G07C 2209/63; G07C 9/00563; G01S 7/411; G01S 13/765; H04W 52/0229; G06V 20/52
See application file for complete search history.

(56) References Cited

U.S. PATENT DOCUMENTS

| | | |
|---|---|---|
| 7,499,674 B2 | 3/2009 | Salokannel et al. |
| 7,597,250 B2 | 10/2009 | Finn |

(Continued)

FOREIGN PATENT DOCUMENTS

| | | |
|---|---|---|
| AU | 2021253293 | 6/2024 |
| CN | 202703516 | 1/2013 |

(Continued)

OTHER PUBLICATIONS

"International Application Serial No. PCT EP2021 055286, International Search Report mailed Jun. 4, 2021", 5 pgs.

(Continued)

*Primary Examiner* — Vernal U Brown
(74) *Attorney, Agent, or Firm* — Schwegman Lundberg & Woessner, P.A.

(57) ABSTRACT

A reader device of a physical access control system includes an ultra-wide band (UWB) physical layer and processing circuitry. The processing circuitry is operatively coupled to the UWB physical layer and is configured to: receive access credential information from a separate second device; receive ranging information from the second device; grant access through a physical portal according to the access credential information and ranging information; determine a number of people intending to pass through the physical portal; and generate an indication according to the determined number.

19 Claims, 5 Drawing Sheets

(51) Int. Cl.
*G01S 13/02* (2006.01)
*G01S 13/76* (2006.01)

(56) References Cited

U.S. PATENT DOCUMENTS

| | | | |
|---|---|---|---|
| 7,756,002 | B2 | 7/2010 | Batra et al. |
| 7,881,746 | B2 | 2/2011 | Desai |
| 7,995,644 | B2 | 8/2011 | Sahinoglu et al. |
| 8,355,671 | B2 | 1/2013 | Kramer et al. |
| 8,478,360 | B2 | 7/2013 | Soliman |
| 8,736,438 | B1 | 5/2014 | Vasquez et al. |
| 8,913,599 | B2 | 12/2014 | Gonikberg et al. |
| 9,408,147 | B2 | 8/2016 | Polo et al. |
| 9,530,265 | B2 | 12/2016 | Lee et al. |
| 9,666,005 | B2 | 5/2017 | Ellis et al. |
| 9,721,404 | B2 | 8/2017 | Muller |
| 9,769,627 | B2 | 9/2017 | Siswick et al. |
| 9,942,849 | B1 | 4/2018 | Hariharan et al. |
| 10,117,046 | B2 | 10/2018 | Ledvina et al. |
| 10,171,129 | B1 | 1/2019 | Hammerschmidt et al. |
| 10,356,553 | B2 | 7/2019 | Sant et al. |
| 10,486,646 | B2 | 11/2019 | Ledvina et al. |
| 10,567,034 | B2 | 2/2020 | Hammerschmidt et al. |
| 10,602,556 | B2 | 3/2020 | Foster et al. |
| 10,652,925 | B2 | 5/2020 | Naguib et al. |
| 10,660,037 | B2 | 5/2020 | Hariharan et al. |
| 10,759,389 | B2 | 9/2020 | Ledvina et al. |
| 10,819,029 | B2 | 10/2020 | Amiri et al. |
| 2003/0232620 | A1 | 12/2003 | Runkle et al. |
| 2014/0355582 | A1 | 12/2014 | Kamath et al. |
| 2015/0124923 | A1* | 5/2015 | Jeon ............... G06M 11/00 377/6 |
| 2015/0310681 | A1 | 10/2015 | Avery et al. |
| 2015/0332532 | A1 | 11/2015 | Lee et al. |
| 2016/0234008 | A1 | 8/2016 | Hekstra et al. |
| 2016/0241999 | A1 | 8/2016 | Chin et al. |
| 2016/0278006 | A1 | 9/2016 | Lee et al. |
| 2016/0284183 | A1 | 9/2016 | Trani |
| 2016/0316500 | A1 | 10/2016 | Aliyar |
| 2016/0353233 | A1 | 12/2016 | Yong et al. |
| 2016/0360341 | A1 | 12/2016 | Srivatsa et al. |
| 2017/0070919 | A1 | 3/2017 | Verger et al. |
| 2017/0151918 | A1 | 6/2017 | Boesen |
| 2017/0153636 | A1 | 6/2017 | Boesen |
| 2017/0158202 | A1 | 6/2017 | Yang |
| 2017/0232930 | A1 | 8/2017 | Murar et al. |
| 2017/0236346 | A1 | 8/2017 | Murar et al. |
| 2019/0097317 | A1 | 3/2019 | Di Nallo et al. |
| 2019/0098499 | A1 | 3/2019 | Lerch et al. |
| 2019/0116619 | A1 | 4/2019 | Hauck et al. |
| 2020/0053689 | A1 | 2/2020 | Mcqueen et al. |
| 2020/0077246 | A1 | 3/2020 | Mars et al. |
| 2020/0098211 | A1 | 3/2020 | Baumgarte et al. |
| 2020/0150261 | A1 | 5/2020 | Naguib et al. |
| 2020/0259522 | A1 | 8/2020 | Hammerschmidt et al. |
| 2020/0320188 | A1 | 10/2020 | Graff et al. |
| 2020/0351781 | A1 | 11/2020 | Hariharan et al. |
| 2021/0158637 | A1* | 5/2021 | Kincaid ............... H04W 4/023 |
| 2021/0359727 | A1* | 11/2021 | Kuriyama ............ H04B 7/0617 |

FOREIGN PATENT DOCUMENTS

| | | |
|---|---|---|
| CN | 115552490 | 12/2022 |
| EP | 2617242 | 10/2016 |
| EP | 3101874 | 12/2016 |
| IN | 202217062678 | 2/2023 |
| JP | 6205237 | 9/2017 |
| JP | 2023524938 | 6/2023 |
| JP | 2024061786 | 5/2024 |
| KR | 101077406 | 10/2011 |
| KR | 20170040240 | 4/2017 |
| KR | 20190104401 | 9/2019 |
| WO | 2013178163 | 12/2013 |
| WO | 2016007627 | 1/2016 |
| WO | 2016059451 | 4/2016 |
| WO | 2017136725 | 8/2017 |
| WO | 2017144345 | 8/2017 |
| WO | 2021204467 | 10/2021 |

OTHER PUBLICATIONS

"International Application Serial No. PCT EP2021 055286, Written Opinion mailed Jun. 4, 2021", 6 pgs.

"Australian Application Serial No. 2021253293, Voluntary Amendment filed Jan. 25, 2023.", 13 pgs.

"Indian Application Serial No. 202217062678, First Examination Report mailed Feb. 28, 2023", with English translation, 6 pages.

"Japanese Application Serial No. 2022-561535, Final Notification of Reasons for Refusal mailed Aug. 22, 2023", with English translation, 6 pages.

"Australian Application Serial No. 2021253293, First Examination Report mailed Aug. 25, 2023", 4 pgs.

"Indian Application Serial No. 202217062678, Response Filed Aug. 28, 2023 to First Examination Report mailed Feb. 28, 2023", with English claims, 23 pages.

"Japanese Application Serial No. 2022-561535, Response filed Nov. 17, 2023 to Final Notification of Reasons for Refusal mailed Aug. 22, 2023", W English Claims, 11 pgs.

"Australian Application Serial No. 2021253293, Response Filed Feb. 1, 2024 to First Examination Report mailed Aug. 25, 2023", 14 pgs.

"Canadian Application Serial No. 3,173,957, Examiners Rule 86(2) Report mailed Mar. 6, 2024", 5 pgs.

"Korean Application Serial No. 10-2022-7039398, Notice of Preliminary Rejection mailed Jun. 28, 2024", with English translation, 13 pages.

* cited by examiner

ULTRA-WIDE BAND RADAR FOR TAILGATING DETECTION IN ACCESS CONTROL SYSTEMS

CROSS-REFERENCE TO RELATED APPLICATION(S)

This application is a national stage application under 35 U.S.C. § 371 of PCT Patent Application Serial No. PCT/EP2021/055286, titled "Ultra-Wide Band Radar for Tailgating Detection in Access Control Systems," filed Mar. 3, 2021, which claims priority to U.S. Provisional Patent Application Ser. No. 63/008,252, titled "Ultra-Wide Band Radar for Tailgating Detection," filed Apr. 10, 2020, each of which is incorporated by reference herein in its entirety.

TECHNICAL FIELD

Embodiments illustrated and described herein generally relate to access control system architectures that include ultra-wide band enabled devices.

BACKGROUND

Ultra-wide band (UWB) is a radio frequency (RF) technique that uses short, low power, pulses over a wide frequency spectrum. The pulses are on the order of millions of individual pulses per second. The width of the frequency spectrum is generally greater than 500 megahertz or greater than twenty percent of an arithmetic center frequency.

DETAILED DESCRIPTION

Seamless access control refers to when physical access is granted to an authorized user through a controlled portal without requiring intrusive actions of the user such as entering or swiping an access card at a card reader or entering a personal identification number (PIN) or password. A Physical Access Control System (PACS) is a type of system that can provide seamless access. A PACS authenticates and authorizes a person to pass through a physical access point such as a secured door. The architecture of a PACS may vary significantly based on the application (e.g., a hotel, a residence, an office, etc.), the technology (e.g., access interfaces technology, door type, etc.), and the manufacturer.

Figure 1:
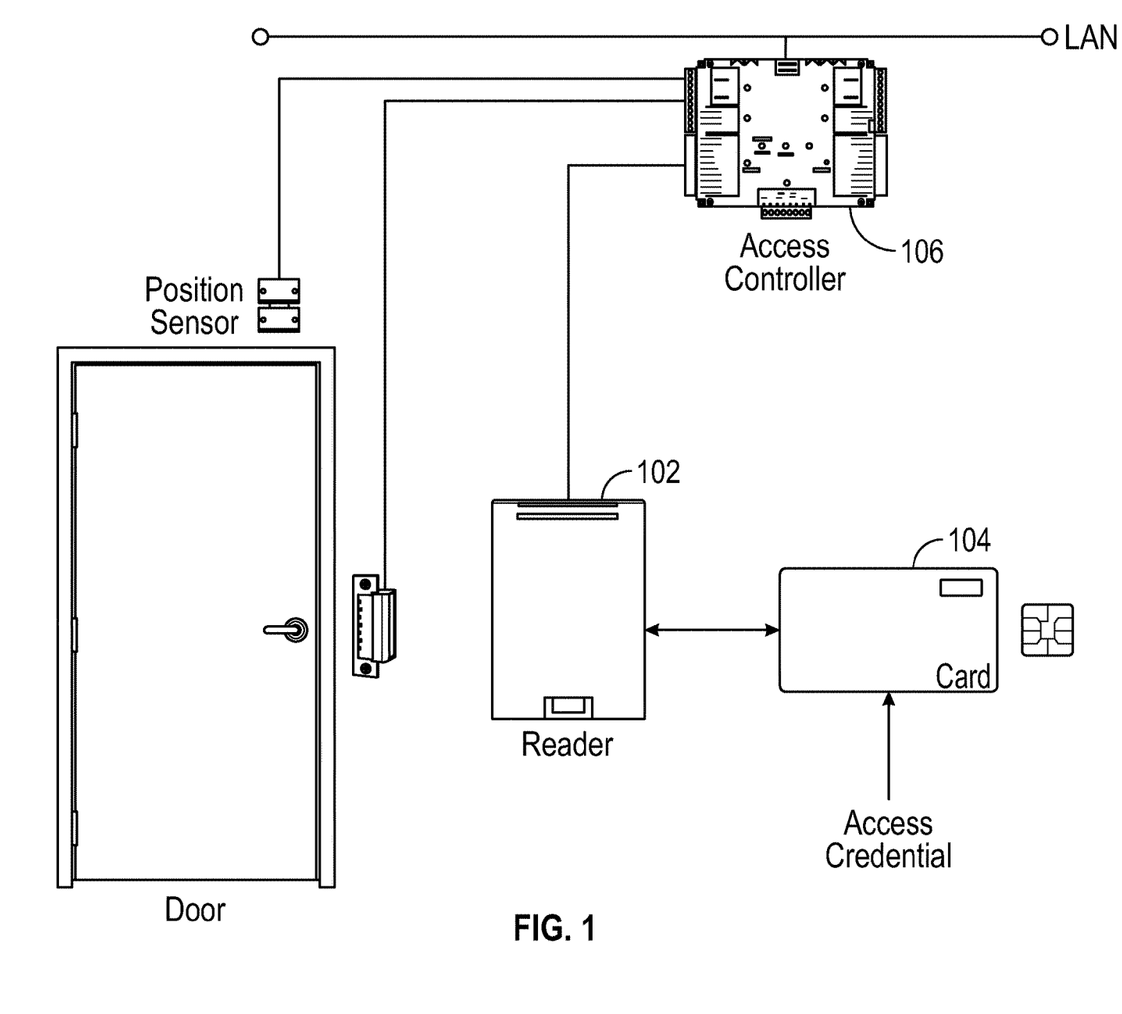
FIG. 1 is an illustration of a basic Physical Access Control System (PACS) structure.

FIG. 1 is an illustration of a basic PACS structure useful for an office application. The Access Credential is a data object, a piece of knowledge (e.g., PIN, password, etc.), or a facet of the person's physical being (e.g., face, fingerprint, etc.) that provides proof of the person's identity. The Credential Device 104 stores the Access Credential when the Access Credential is a data object. The Credential Device 104 may be a smartcard or smartphone. Other examples of Credential Devices include, but are not limited to, proximity radio frequency identification based (RFID-based) cards, access control cards, credit cards, debit cards, passports, identification cards, key fobs, near field communication (NFC) enabled devices, mobile phones, personal digital assistants (PDAs), tags, or any other device configurable to emulate a virtual credential.

The Credential Device 104 can be referred to as the Access Credential. The Reader device 102 retrieves and authenticates the Access Credential when a Credential Device is used and sends the Access Credential to the Access Controller 106. The Access Controller 106 compares the Access Credential to an Access Control list and grants or denies access based on the comparison, such as by controlling an automatic lock on a door for example.

The functionality of an Access Controller 106 may be included in the Reader device 102. These Reader devices can be referred to as offline readers or standalone readers. If the unlocking mechanism is included as well, a device is referred to as smart door lock which is more typically used in residential applications. Devices such as smart door locks are often battery powered, and power consumption and battery lifetime can be key parameters for the devices.

For physical access applications, an electronic device needs to authenticate a person, which can require different methodologies than those used for electronic devices authenticating each other. Authentication methods for persons are typically split into three broad categories: "Something you know," "Something you have," or "Something you are." For a PACS, "Proof of Presence" is as important as the authentication when granting access through a particular physical portal at a given moment in time. Impulse Radio Ultra-Wideband (IR-UWB, or simply UWB) can provide Proof of Presence information in a secure manner.

UWB is a radio communication methodology that uses a wide signal bandwidth. The wide bandwidth is typically defined as either a −10 decibel (−10 dB) bandwidth greater than 20% of the center frequency of the signal, or a bandwidth greater than 500 megahertz (500 MHz) in absolute terms. Commercial UWB systems are intended to be used in complex environments such as residential, office, or industrial indoor areas. In these environments, signal reflection and diffraction play a significant role. The signal received by an antenna is the sum of the attenuated, delayed and possibly overlapping versions of the transmitted signal and may vary over time (due to movement of receiver/transmitter or change in environment). These different versions of the transmitted signal are typically referred to as multipath components. The large bandwidth of UWB systems provides a high level of resilience to frequency selective fading, which is an effect that can limit the performance of narrow-band technologies.

In a PACS, an access sequence may comprise four parts: Proof of Presence, Intent Detection, Authentication, and Authorization. The user approaches the door and presents their access credential or credential device. This provides the Proof of Presence and Intent portions of the sequence. The reader device checks the validity of the access credential (the Authentication portion) and sends it to the access controller (e.g., using a local area network or LAN), which grants or denies access (the Authorization portion). As explained above, seamless access is access granted without intrusive actions to show Intent (e.g., presenting a card, entering a password etc.), while maintaining the same level of security as a conventional access system. The secure and accurate ranging capability of UWB makes it a suitable technology to enable seamless access because the ranging can be used to determine Presence and Intent without a need for actions by the user.

Figure 2:
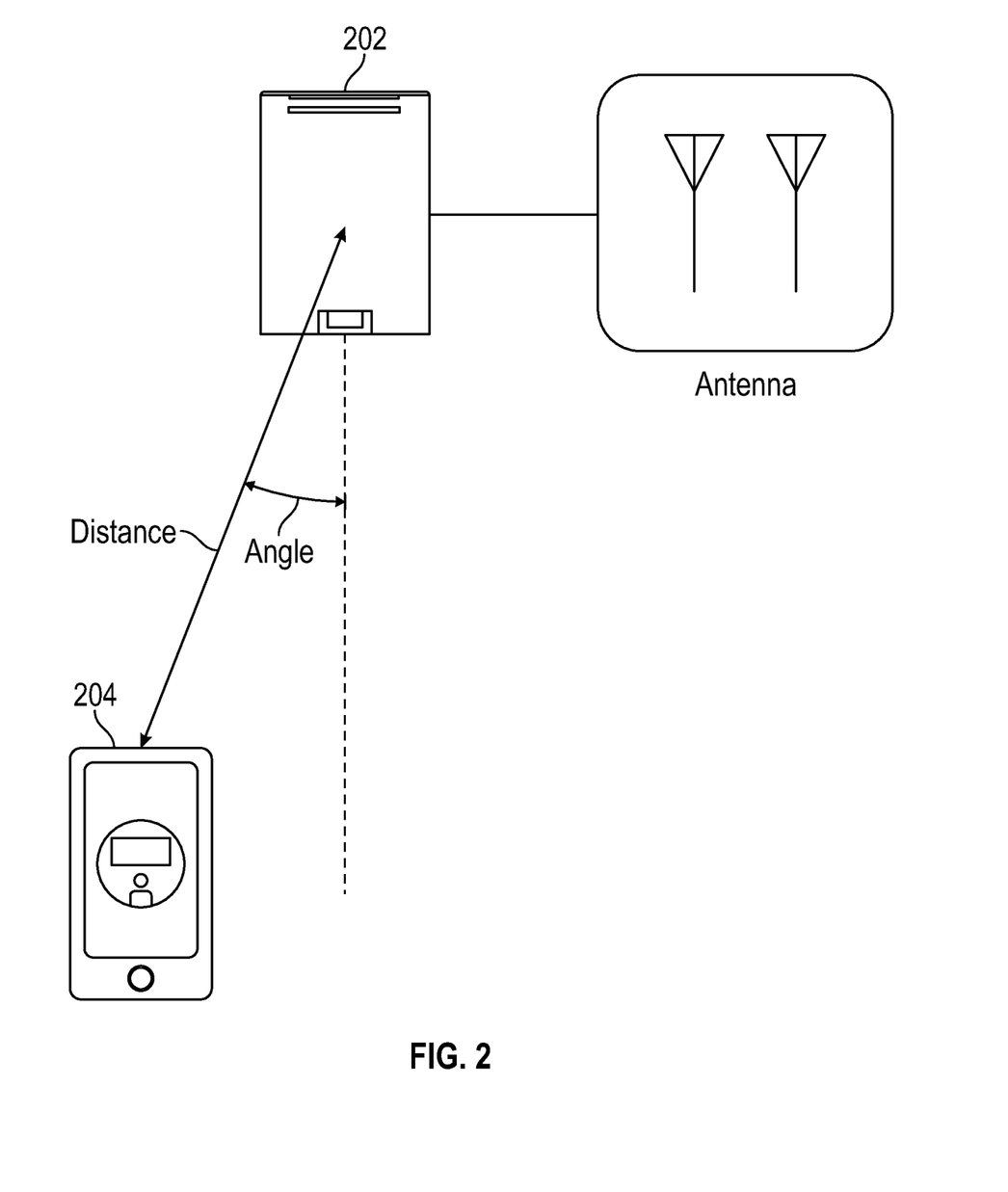
FIG. 2 is a block diagram of an example of an ultra-wide band (UWB) capable device and a Smart UWB capable device including angle of arrival capability.

FIG. 2 is a block diagram of an example of a UWB capable device 202 (e.g., a Reader device or Reader & Controller device) and a Smart UWB capable device 204 (e.g., a Smartphone Credential Device). Ranging by the UWB capable devices can be used to determine Intent of the user. Intent can be deduced by the change in distance between the UWB capable device 202 and the Smart or credential UWB capable device 204, and by the change in angle between the UWB capable device 202 and the Smart UWB capable device 204.

The UWB capable device may perform ranging using Time-of-Flight (TOF) Two Way Ranging (TWR). In TWR, radio packets are exchanged between the UWB capable device (e.g., the Reader device) and the Smart UWB capable device (e.g., a UWB capable smartphone). The timing differences for the transmitting and receiving of the packets between the Reader device and the smartphone can be used to calculate ranging information, such as change in one or both of distance and angle, to determine Intent.

There can be security issues involved with seamless access control. For example, a seamless access system that opens the door when an authorized user is within two meters, may allow multiple persons to enter instead of only the credentialed user when another person is close behind or "tailgating" the credentialed user. The radio frequency signal transmitting capability of a UWB capable device can be used to improve security of a seamless access system.

In the seamless access system, a UWB capable Reader device may switch from Two Way Ranging operation to one way transmitting of radio frequency (RF) signal pulses and detecting of received RF pulses that are the transmitted RF pulses reflected off of objects. The transmitting of pulses and the receiving of the reflected pulses can be used by the UWB capable Reader device as radar to detect tailgating.

In some examples, the RF pulses may be a specific string or pattern of UWB pulses. The UWB capable Reader device may include a correlator to determine the channel impulse response (CIR) from the transmitted pattern of pulses. The correlator may be included in processing circuitry of the UWB capable Reader device. The correlator may determine the CIR by acting as a deconvolution operator on the known pulse pattern. In some examples, the specific pulse pattern transmitted has low autocorrelation properties. In some examples, preamble symbols included in the ranging packets may be the pulse pattern transmitted for the detection radar.

Figure 3:
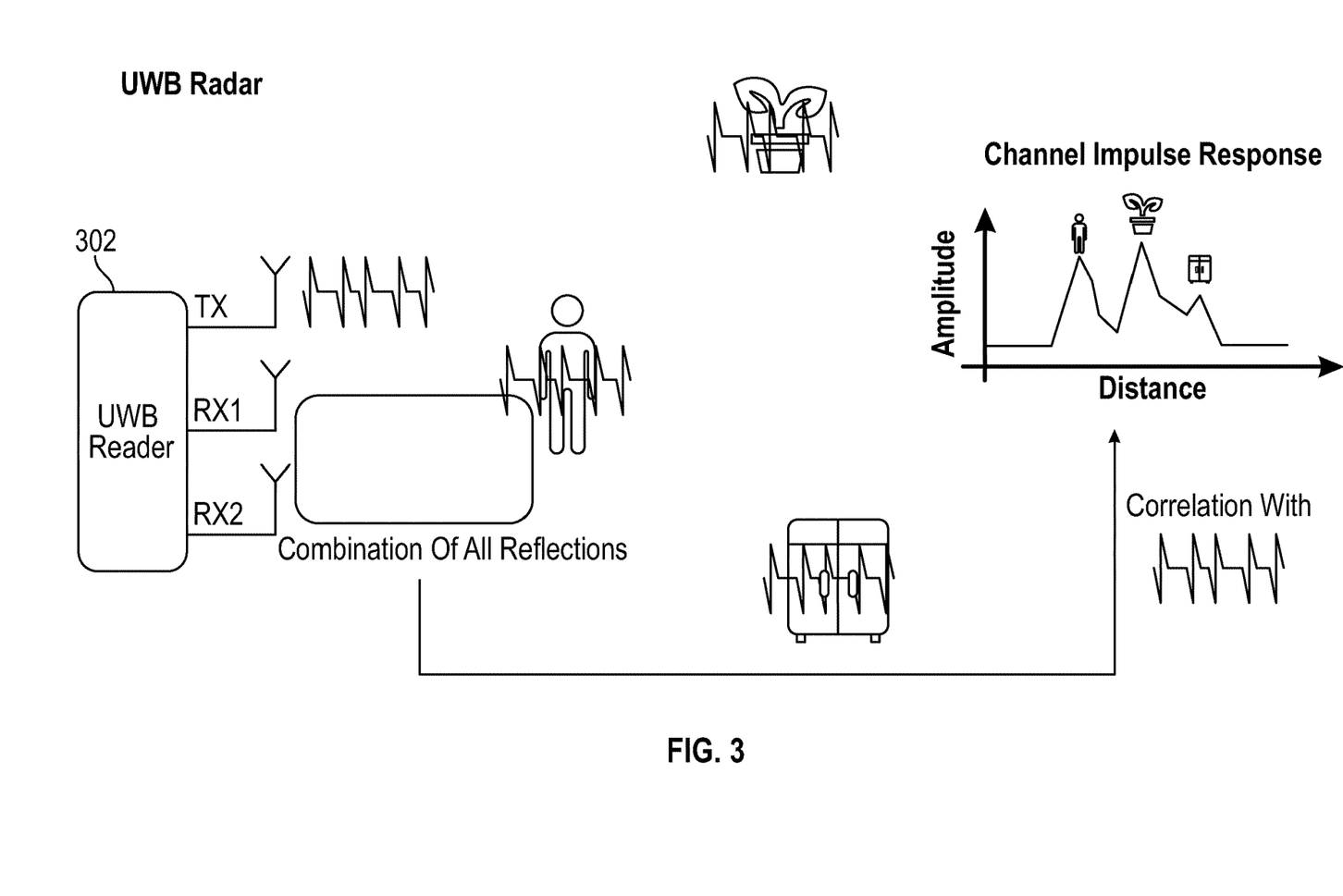
FIG. 3 is a block diagram illustrating using the channel impulse response estimation capability of a UWB capable reader device for UWB radar.

FIG. 3 is a block diagram illustrating using the UWB capable Reader Device for UWB radar. The UWB capable Reader Device 302 transmits radar pulses. The signals transmitted by the UWB capable Reader Device cause signals to be reflected by objects and persons in the environment of the UWB capable Reader Device. By determining the CIR of the reflected signals, a UWB capable Reader Device may obtain information of the RF properties of its environment. By regularly estimating the CIR based on the reflected signals, the UWB capable device can identify changes in the surrounding RF properties, such as changes due to a moving person. Thus, the estimation of the CIR based on the reflected signals by the UWB capable device provides basic radar functionality. This can be used by the UWB capable Reader Device following the ranging/intent detection operations to detect when more persons than the user try to physically pass through a physical portal when the user is given access. For example, an additional reflected signal may be received due to the transmitted signals reflecting off the additional person. The additional reflection may be detected by the processing circuitry of the UWB capable Reader Device as a change in the CIR of received reflected signals.

Figure 4:
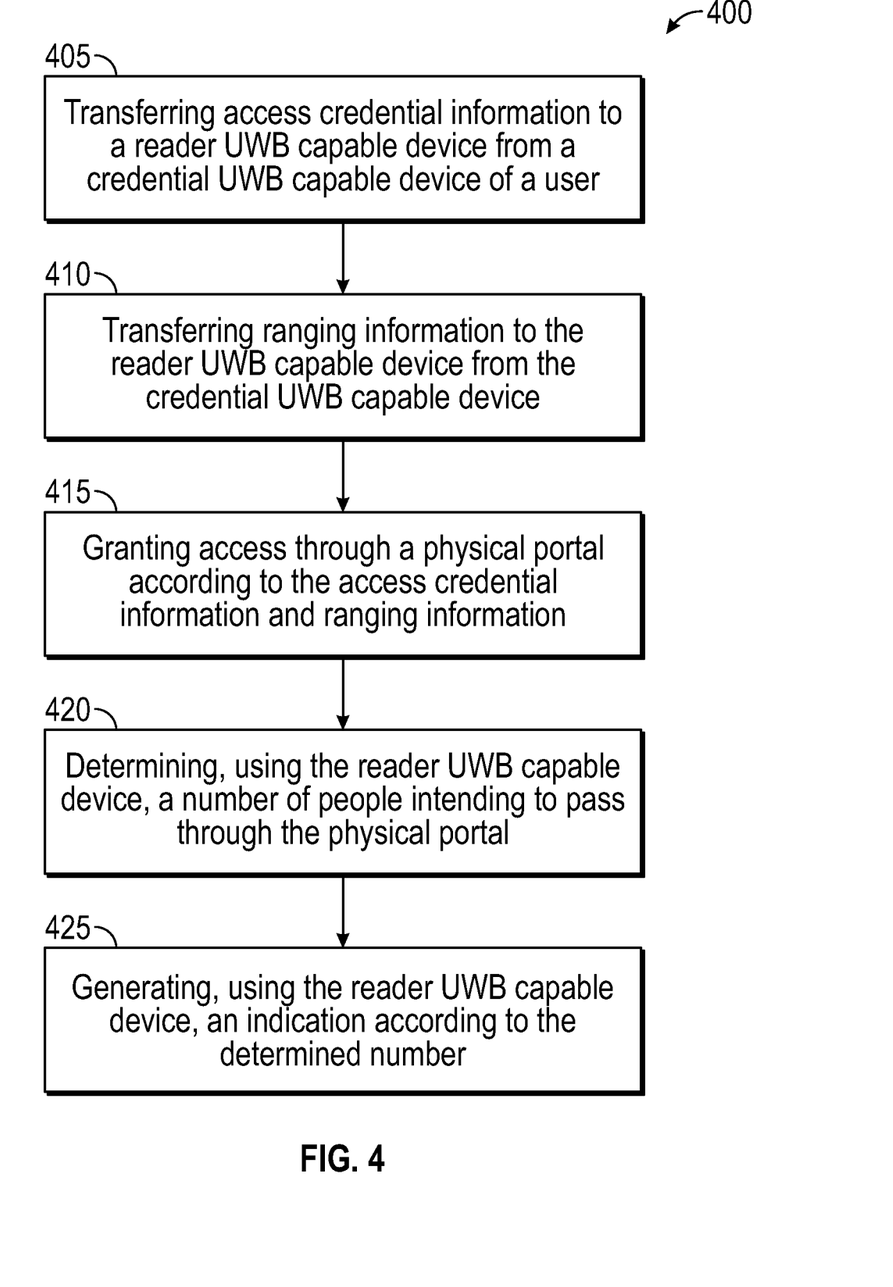
FIG. 4 is a flow diagram of a method of operating a seamless PACS.

FIG. 4 is a flow diagram of a method 400 of operating a seamless PACS. At 405, access credential information is transferred to a UWB capable reader device from a credential UWB capable device of a user. The credential UWB capable device may be a smart UWB capable device (e.g., a smartphone or smartcard) storing access credential information. The reader device may be an authorization-only device that compares the credential information to credential information that is allowed access, or the reader device may be a combination authorization and control device that evaluates credential information and provides access through a physical portal (e.g., a door) when the credential information meets the criteria for access.

To exchange information, the credential UWB capable device may request to open a communication channel with the reader device to transfer the credential information. The communication channel may be a UWB communication channel or may be an out of band (OOB) channel. An example of an OOB channel is a Bluetooth communication channel or a Bluetooth Low Energy (BLE) communication channel. Using BLE for the discovery phase and credentialing phase offers lower energy consumption overhead during the device discovery phase between the credential device and the reader device.

At 410, ranging information is transferred to the UWB capable reader device from the credential UWB capable device. The credential device and the reader device may perform two-way ranging (TWR) and the ranging information may include the credential device and the reader device exchanging packetized information. The ranging information is exchanged using a UWB communication channel. In some examples, the UWB capable reader device and the credential UWB capable device may switch from communication using an OOB communication channel to using the UWB communication channel to transfer the ranging information when the reader device determines that credential information allows access.

At 415, in response to authenticating the credential information and determining that the user is present and intends to pass through the physical portal using ranging, the reader device authorizes the user to pass through the portal. The UWB capable reader device may provide an indication of authorization (e.g., a signal or a code) to an access controller device that provides the physical access. If the reader device is a combined reader-control device, the reader-control device grants physical access to the portal (e.g., by automatically opening or unlocking a door).

At 420, the UWB capable reader device determines the number of people intending to pass through the portal during the time that physical access is granted. In some examples, the reader device may regularly transmit a signal and use reflected RF signals to determine the number of people. A correlator of the UWB capable reader device may determine the CIR of the reflected signals by performing a deconvolution operation on a known pulse pattern of the incoming reflected signals.

At 425, after determining the number of people intending to pass through the physical portal, the UWB capable reader device generates an indication according to the determined number of people. The indication may be an alert or alarm generated when more than one person (i.e., more than only the user of the credential device) gains access or attempts to gain access through the physical portal. The alarm may include one or both of a visual indication and an audible indication of the alarm condition. In some examples, the indication is a signal or code provided to an access control device. In variations, the indication provided to the access control device is the determined number of persons. The access control device activates an alarm or denies access based on the indication from the reader device.

Figure 5:
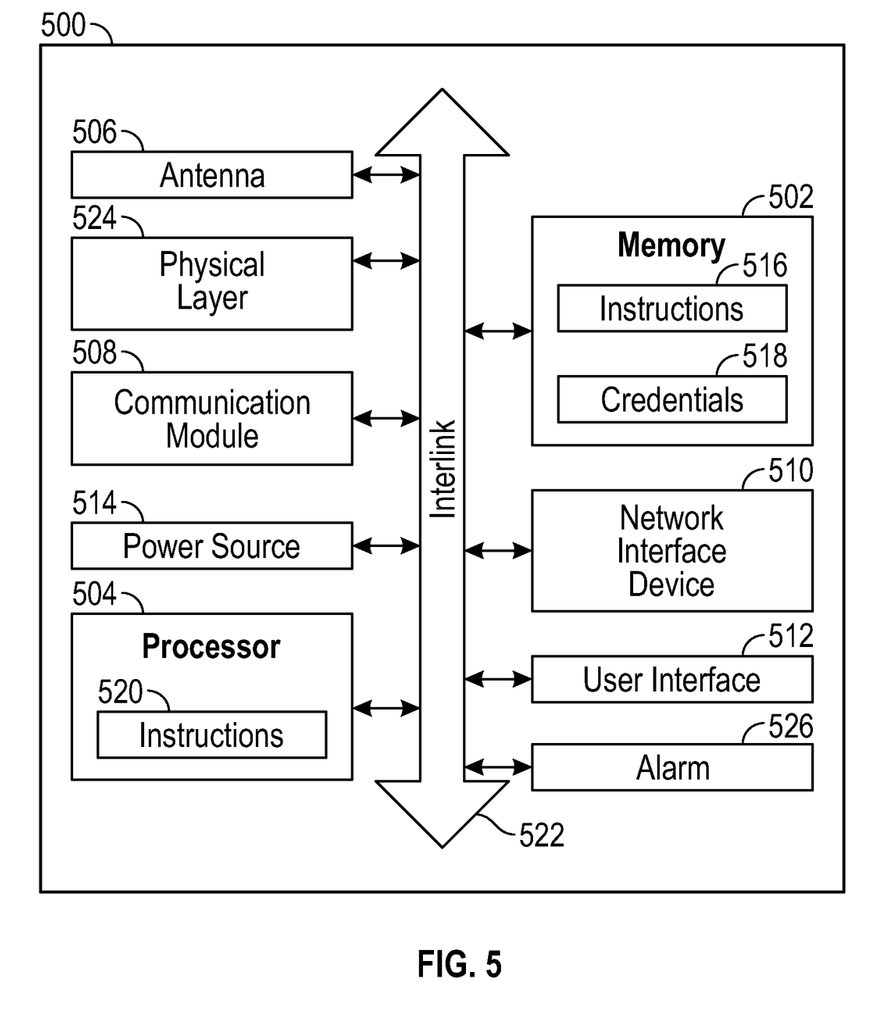
FIG. 5 is a block diagram schematic of portions of an example of a UWB capable device.

FIG. 5 is a block diagram schematic of various example components of a UWB capable device 500 (e.g., an embedded device) for supporting the device architectures described and illustrated herein. The device 500 of FIG. 5 could be, for example, a UWB capable reader device that authenticates credential information of authority, status, rights, and/or entitlement to privileges for the holder of a credential UWB capable device. At a basic level, a UWB capable device can include an interface (e.g., one or more antennas and Integrated Circuit (IC) chip(s)), which permits the device to exchange data with another device, such as a credential device or a reader device. One example of credential device is an RFID smartcard that has data stored thereon allowing a holder of the credential device to access a secure area or asset protected by the reader device.

With reference specifically to FIG. 5, additional examples of a UWB capable device 500 for supporting the device architecture described and illustrated herein may generally include one or more of a memory 502, a processor 504, one or more antennas 506, a communication port or communication module 508, a network interface device 510, a user interface 512, and a power source 514 or power supply.

Memory 502 can be used in connection with the execution of application programming or instructions by processing circuitry, and for the temporary or long-term storage of program instructions or instruction sets 516 and/or authorization data 518, such as credential data, credential authorization data, or access control data or instructions, as well as any data, data structures, and/or computer-executable instructions needed or desired to support the above-described device architecture. For example, memory 502 can contain executable instructions 516 that are used by a processor 504 of the processing circuitry to run other components of device 500, to make access determinations based on credential or authorization data 518, and/or to perform any of the functions or operations described herein, such as the method of FIG. 4 for example. Memory 502 can comprise a computer readable medium that can be any medium that can contain, store, communicate, or transport data, program code, or instructions for use by or in connection with device 500. The computer readable medium can be, for example but is not limited to, an electronic, magnetic, optical, electromagnetic, infrared, or semiconductor system, apparatus, or device. More specific examples of suitable computer readable medium include, but are not limited to, an electrical connection having one or more wires or a tangible storage medium such as a portable computer diskette, a hard disk, a random access memory (RAM), a read-only memory (ROM), an erasable programmable read-only memory (EPROM or Flash memory), Dynamic RAM (DRAM), any solid-state storage device, in general, a compact disc read-only memory (CD-ROM), or other optical or magnetic storage device. Computer-readable media includes, but is not to be confused with, computer-readable storage medium, which is intended to cover all physical, non-transitory, or similar embodiments of computer-readable media.

Processor 504 can correspond to one or more computer processing devices or resources. For instance, processor 504 can be provided as silicon, as a Field Programmable Gate Array (FPGA), an Application-Specific Integrated Circuit (ASIC), any other type of Integrated Circuit (IC) chip, a collection of IC chips, or the like. As a more specific example, processor 504 can be provided as a microprocessor, Central Processing Unit (CPU), or plurality of microprocessors or CPUs that are configured to execute instructions sets stored in an internal memory 520 and/or memory 502.

Antenna 506 can correspond to one or multiple antennas and can be configured to provide for wireless communications between device 500 and another device. Antenna(s) 506 can be coupled to one or more physical (PHY) layers 524 to operate using one or more wireless communication protocols and operating frequencies including, but not limited to, the IEEE 802.15.1, Bluetooth, Bluetooth Low Energy (BLE), near field communications (NFC), ZigBee, GSM, CDMA, Wi-Fi, RF, UWB, and the like. In an example, antenna 506 may include one or more antennas coupled to one or more physical layers 524 to operate using UWB for in band activity/communication and Bluetooth (e.g., BLE) for out-of-band (OOB) activity/communication. However, any RFID or personal area network (PAN) technologies, such as the IEEE 502.15.1, near field communications (NFC), ZigBee, GSM, CDMA, Wi-Fi, etc., may alternatively or additionally be used for the OOB activity/communication described herein.

Device 500 may additionally include a communication module 508 and/or network interface device 510. Communication module 508 can be configured to communicate according to any suitable communications protocol with one or more different systems or devices either remote or local to device 500. Network interface device 510 includes hardware to facilitate communications with other devices over a communication network utilizing any one of a number of transfer protocols (e.g., frame relay, internet protocol (IP), transmission control protocol (TCP), user datagram protocol (UDP), hypertext transfer protocol (HTTP), etc.). Example communication networks can include a local area network (LAN), a wide area network (WAN), a packet data network (e.g., the Internet), mobile telephone networks (e.g., cellular networks), Plain Old Telephone (POTS) networks, wireless data networks (e.g., IEEE 802.11 family of standards known as Wi-Fi, IEEE 802.16 family of standards known as WiMax), IEEE 802.15.4 family of standards, and peer-to-peer (P2P) networks, among others. In some examples, network interface device 510 can include an Ethernet port or other physical jack, a Wi-Fi card, a Network Interface Card (NIC), a cellular interface (e.g., antenna, filters, and associated circuitry), or the like. In some examples, network interface device 510 can include a plurality of antennas to wirelessly communicate using at least one of single-input multiple-output (SIMO), multiple-input multiple-output (MIMO), or multiple-input single-output (MISO) techniques. In some example embodiments, one or more of the antenna 506, communication module 508, and/or network interface device 510 or subcomponents thereof, may be integrated as a single module or device, function or operate as if they were a single module or device, or may comprise of elements that are shared between them.

User interface 512 can include one or more input devices and/or display devices. Examples of suitable user input devices that can be included in user interface 512 include, without limitation, one or more buttons, a keyboard, a mouse, a touch-sensitive surface, a stylus, a camera, a microphone, etc. Examples of suitable user output devices that can be included in user interface 512 include, without limitation, one or more LEDs, an LCD panel, a display screen, a touchscreen, one or more lights, a speaker, etc. It should be appreciated that user interface 512 can also include a combined user input and user output device, such as a touch-sensitive display or the like. The user interface 512 may include a separate alarm circuit 526 to indicate an alarm condition. Alarm circuit 526 may provide an audio signal to a speaker or may activate a light or present an alarm condition using a display device.

Power source 514 can be any suitable internal power source, such as a battery, capacitive power source or similar type of charge-storage device, etc., and/or can include one or more power conversion circuits suitable to convert external power into suitable power (e.g., conversion of externally-supplied AC power into DC power) for components of the device 500.

Device 500 can also include one or more interlinks or buses 522 operable to transmit communications between the various hardware components of the device. A system bus 522 can be any of several types of commercially available bus structures or bus architectures.

ADDITIONAL DISCLOSURE AND EXAMPLES

Example 1 includes subject matter (such as a reader device of a seamless physical access control system (PACS)) comprising an ultra-wide band (UWB) physical layer and processing circuitry operatively coupled to the UWB physical layer. The processing circuitry is configured to receive access credential information from a separate second device; receive ranging information from the second device; grant access through a physical portal according to the access credential information and ranging information; determine a number of people intending to pass through the physical portal; and generate an indication according to the determined number.

In Example 2, the subject matter of Example 1 optionally includes an alarm circuit and processing circuitry configured to activate the alarm circuit according to the determined number of people intending to pass through the physical portal.

In Example 3, the subject matter of one or both of Examples 1 and 2 optionally includes a network interface and processing circuitry is configured to provide the generated indication of the determined number of people to an access device of the seamless PACS via the network interface.

In Example 4, the subject matter of one or any combination of Examples 1-3 optionally includes an out of band (OOB) physical layer and processing circuitry configured to establish an OOB communication layer to receive the access credential information; initiate transmission of a transmit signal using the UWB physical layer; receive a reflected signal using the UWB physical layer that corresponds to the transmitted signal reflecting off an object; and determine the number of people intending to pass through the physical portal using the received reflected signal.

In Example 5, the subject matter of Example 4 optionally includes processing circuitry configured to include a specified pattern of radio frequency (RF) signal pulses in the transmit signal; estimate a channel impulse response (CIR) of the reflected signal using the specified pattern of RF signal pulses included in the reflected signal; and determine the number of people using the estimated CIR of the reflected signal.

In Example 6, the subject matter of Example 5 optionally includes processing circuitry configured to include a preamble pattern in a preamble field in the transmit signal; and use the preamble pattern in the reflected signal to determine the CIR of the reflected signal.

In Example 7, the subject matter of one or any combination of Examples 4-6 optionally includes processing circuitry configured to initiate transmission of a signal to determine the number of people after granting access to the user.

In Example 8, the subject matter of one or any combination of Examples 4-6 optionally includes processing circuitry configured to initiate transmission of a signal to determine the number of people after receiving a request to open a communication channel from the second device.

In Example 9, the subject matter of one or any combination of Examples 4-6 optionally includes processing circuitry configured to initiate transmission of a signal to determine the number of people after exchanging ranging information with the second device.

Example 10 includes subject matter (such as a method of operating a seamless physical access control system) or can optionally be combined with one or any combination of Examples 1-9 to include such subject matter, comprising transferring access credential information to a ultra-wide band (UWB) capable reader device from a credential UWB capable device of a user; transferring ranging information to the UWB capable reader device from the credential UWB capable device; granting access through a physical portal according to the access credential information and ranging information; determining, using the UWB capable reader device, a number of people intending to pass through the physical portal; and generating, using the UWB capable reader device, an indication according to the determined number.

In Example 11, the subject matter of Example 10 optionally includes transmitting a radio frequency (RF) signal using the UWB capable reader device; receiving a reflected RF signal corresponding to the transmitted RF signal reflecting off an object; and determining the number of people intending to pass through the physical portal using the reflected signal.

In Example 12, the subject matter of Example 11 optionally includes transmitting an RF signal that includes a specified pattern of RF signal pulses; estimating a channel impulse response (CIR) of the reflected signal using the specified pattern of RF pulses; and determining the number of people according to a change in the estimated CIR of the reflected signal.

In Example 13, the subject matter of Example 12 optionally includes transmitting an RF signal that includes a preamble field of a transmitted radio packet as the specified pattern of RF signal pulses.

In Example 14, the subject matter of one or any combination of Examples 11-13 optionally includes transmitting a specified pattern of UWB signal pulses.

In Example 15, the subject matter of one or any combination of Examples 10-14 optionally includes the UWB capable reader device determining the number of people after granting access to the user.

In Example 16, the subject matter of one or any combination of Examples 10-14 optionally includes the UWB capable reader device determining the number of people after receiving a request from the credential device to open a communication session.

In Example 17, the subject matter of one or any combination of Examples 10-16 optionally includes generating an alarm when the determined number is more than one.

In Example 18, the subject matter of one or any combination of Examples 10-17 optionally includes sending the determined number of people to an access control device.

In Example 19, the subject matter of one or any combination of Examples 10-18 optionally includes transferring the access credential information using an out of band (OOB) communication channel established between the UWB capable reader device and the credential UWB capable device; and using a UWB communication channel to transfer the ranging information and to determine the number of people intending to pass through the physical portal.

Example 20 can include subject matter (or can optionally be combined with one or any combination of Examples 1-19 to include such subject matter) such as a computer-readable storage medium including instructions that, when executed by processing circuitry of an ultra-wide band (UWB) capable device, cause the UWB capable device to perform acts comprising: receiving access credential information from a separate second device; receiving ranging information from the second device; granting access through a physical portal according to the access credential information and ranging information; determining a number of people intending to pass through the physical portal; and generating an indication according to the determined number.

In Example 21, the subject matter of Example 20 optionally includes including instructions that cause the UWB capable device to perform acts comprising: transmitting a signal using a physical layer of the UWB capable device; receiving a reflected signal corresponding to the transmitted signal reflecting off an object; and determining a channel impulse response (CIR) of the reflected signal.

In Example 22, the subject matter of Example 21 optionally includes including instructions that cause the UWB capable device to perform acts comprising: transmitting a signal that includes a specified pattern of UWB signal pulses; and estimating the CIR of the reflected signal using deconvolution on the received reflected signal according to the specified pattern of UWB signal pulses.

The above Examples can be combined in any permutation or combination. The above detailed description includes references to the accompanying drawings, which form a part of the detailed description. The drawings show, by way of illustration, specific embodiments in which the invention can be practiced. These embodiments are also referred to herein as "examples." All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to allow the reader to quickly ascertain the nature of the technical disclosure. It is submitted with the understanding that it will not be used to interpret or limit the scope or meaning of the claims. In the above Detailed Description, various features may be grouped together to streamline the disclosure. This should not be interpreted as intending that an unclaimed disclosed feature is essential to any claim. Rather, the subject matter may lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope should be determined with reference to the appended claims, along with the full scope of equivalents to which such claims are entitled.

What is claimed is:

1. A reader device of a physical access control system (PACS), the reader device comprising:
   an ultra-wide band (UWB) physical layer; and
   processing circuitry operatively coupled to the UWB physical layer and configured to:
   receive access credential information from a separate second device;
   use two-way ranging to receive ranging information from the second device using the UWB physical layer;
   grant access through a physical portal according to the access credential information and ranging information;
   use one-way signaling to transmit a UWB signal using the UWB physical layer, wherein the transmitted UWB signal includes a specified pattern of radio frequency (RF) signal pulses;
   receive a reflected signal using the UWB physical layer that corresponds to the transmitted UWB signal reflecting off one or more objects;
   determine a number of people intending to pass through the physical portal using the reflected signal; and
   generate an indication according to the determined number of people.

2. The reader device of claim 1, including an alarm circuit, wherein the processing circuitry is configured to activate the alarm circuit according to the determined number of people intending to pass through the physical portal.

3. The reader device of claim 1, including a network interface, wherein the processing circuitry is configured to provide the generated indication of the determined number of people to an access device of the PACS via the network interface.

4. The reader device of claim 1, including an out of band (OOB) physical layer, wherein the processing circuitry is configured to:
   establish an OOB communication layer to receive the access credential information; and
   initiate transmitting the UWB signal using the UWB physical layer in response to receiving the access credential information.

5. The reader device of claim 4, wherein the processing circuitry is configured to initiate transmission of the transmitted UWB signal after granting access.

6. The reader device of claim 4, wherein the processing circuitry is configured to initiate transmission of the transmitted UWB signal after receiving ranging information from the second device.

7. The reader device of claim 1, wherein the processing circuitry is configured to:
estimate a channel impulse response (CIR) of the reflected signal using the specified pattern of RF signal pulses included in the reflected signal; and
determine the number of people using the estimated CIR of the reflected signal.

8. The reader device of claim 7, wherein the processing circuitry is configured to:
include a preamble pattern in a preamble field in the transmitted UWB signal; and
use the preamble pattern in the reflected signal to determine the CIR of the reflected signal.

9. A method of operating a seamless physical access control system, the method comprising:
receiving access credential information at an ultra-wide band (UWB) capable reader device from a credential UWB capable device of a user;
using two-way ranging to receiving ranging information at the UWB capable reader device from the credential UWB capable device;
granting access through a physical portal according to the access credential information and ranging information;
performing one-way UWB signaling to transmit a UWB signal using the UWB capable reader device, wherein the transmitted UWB signal includes a specified pattern of radio frequency (RF) signal pulses;
receiving a reflected UWB signal by the UWB capable reader device that corresponds to a transmitted UWB signal reflecting off one or more objects;
determining, using the UWB capable reader device, a number of people using the received reflected UWB signal; and
generating, using the UWB capable reader device, an indication according to the determined number of people.

10. The method of claim 9, including:
receiving the access credential information using an out of band (OOB) communication channel established between the UWB capable reader device and the credential UWB capable device; and
transmitting the UWB signal that includes the specified pattern of RF pulses using the UWB capable reader device in response to receiving the access credential information.

11. The method of claim 9, including:
wherein receiving a reflected RF signal includes estimating a channel impulse response (CIR) of the reflected signal using the specified pattern of RF pulses; and
wherein determining the number of people intending to pass through the physical portal includes determining the number of people according to a change in the estimated CIR of the reflected signal.

12. The method of claim 11, wherein transmitting an RF signal includes transmitting a preamble field of a transmitted radio packet as the specified pattern of RF pulses.

13. The method of claim 9, wherein determining the number of people includes the UWB capable reader device determining the number of people after granting access.

14. The method of claim 9, wherein determining the number of people includes the UWB capable reader device determining the number of people after receiving a request from the credential UWB capable device to open a communication session.

15. The method of claim 9, wherein generating the indication according to the determined number includes generating an alarm when the determined number is more than one.

16. The method of claim 9, wherein generating the indication includes sending the determined number of people to an access control device.

17. The method of claim 9, wherein:
receiving the access credential information includes receiving the access credential information using an out of band (OOB) communication channel established between the UWB capable reader device and the credential UWB capable device; and
receiving ranging information and determining the number of people includes using a UWB communication channel to receive the ranging information and to determine the number of people intending to pass through the physical portal.

18. A non-transitory computer-readable storage medium including instructions that, when executed by processing circuitry of an ultra-wide band (UWB) capable device, cause the UWB capable device to perform acts comprising:
receiving access credential information from a separate second device;
receiving ranging information from the second device using two-way ranging;
granting access through a physical portal according to the access credential information and ranging information;
performing one-way UWB signaling to transmit a UWB signal that includes a specified pattern of UWB signal pulses;
receiving a reflected UWB signal that corresponds to a transmitted UWB signal reflecting off one or more objects;
determining a number of people using the reflected UWB signal; and
generating an indication according to the determined number of people.

19. The non-transitory computer-readable storage medium of claim 18, including instructions that cause the UWB capable device to perform acts comprising:
determining a channel impulse response (CIR) of the reflected UWB signal, including estimating the CIR of the reflected signal using deconvolution on the received reflected UWB signal according to the specified pattern of UWB signal pulses.

* * * * *